US008046790B2

(12) United States Patent
Bronstein et al.

(10) Patent No.: US 8,046,790 B2
(45) Date of Patent: Oct. 25, 2011

(54) MEDIA PROJECTOR SYSTEM FOR PREVENTING THE DISPLAY OF ON-SCREEN DISPLAY INFORMATION (75) Inventors: Kenneth H. Bronstein, Corvallis, OR (US); David H. Ochs, Corvallis, OR (US); Bruce A. Stephens, Corvallis, OR (US); Frederick D. Taft, Corvallis, OR (US)

(73) Assignee: Hewlett-Packard Development Company, L. P., Houston, TX (US)

(*) Notice: Subject to any disclaimer, the term of this patent is extended or adjusted under 35 U.S.C. 154(b) by 1429 days.

(21) Appl. No.: 10/884,928

(22) Filed: Jul. 6, 2004

(65) Prior Publication Data
US 2006/0020998 A1 Jan. 26, 2006

(51) Int. Cl.
G06F 3/00 (2006.01)
G06F 13/00 (2006.01)
H04N 5/445 (2006.01)
H04N 7/173 (2006.01)
H04N 7/16 (2006.01)

(52) U.S. Cl. .............. 725/37; 725/100; 725/151
(58) Field of Classification Search .......... 725/89, 725/100, 134–136, 141, 151, 153, 37–61, 725/553, 569; 348/569, 553
See application file for complete search history.

(56) References Cited

U.S. PATENT DOCUMENTS

| | | | |
|---|---|---|---|
| 5,724,104 A | 3/1998 | Eom et al. | |
| 5,847,748 A | 12/1998 | Laughlin | |
| RE36,060 E | 1/1999 | Miyashita | |
| 5,986,985 A * | 11/1999 | Kawamura et al. | 369/44.27 |
| 6,038,614 A * | 3/2000 | Chan et al. | 710/1 |
| 6,141,004 A * | 10/2000 | Jeong | 715/723 |
| 6,347,186 B2 | 2/2002 | Watanabe | |
| 6,385,388 B1 * | 5/2002 | Lewis et al. | 386/94 |
| 6,522,419 B1 | 2/2003 | Ko | |
| 6,540,365 B1 * | 4/2003 | Fujiwara et al. | 353/69 |
| 6,549,503 B2 | 4/2003 | Matos | |
| 6,577,330 B1 | 6/2003 | Tsuda et al. | |
| 6,626,543 B2 | 9/2003 | Derryberry | |
| 6,661,437 B1 * | 12/2003 | Miller et al. | 715/810 |
| 6,783,252 B1 * | 8/2004 | Cambron | 353/122 |
| 6,950,083 B1 * | 9/2005 | Lee | 345/87 |

(Continued)

FOREIGN PATENT DOCUMENTS

EP 0560125 9/1993

(Continued)

OTHER PUBLICATIONS

Brochure entitled "XL4U Colorview Projector" 2003, by Mitsubishi Digital Electronics America, Inc. Presentation Products Division, 9351 Jeronimo Road, Irvine, CA 92618, #PP3071-DB/03-15MLITXL4. <www.mitsubishi-presentations.com>.

(Continued)

Primary Examiner — Scott Beliveau
Assistant Examiner — Alexander Q Huerta (57) ABSTRACT A system comprising a media player configured to play media content, a projector operatively coupled to the media player, and a control unit operatively coupled to the media player and the projector is provided. The control unit is configured to detect an on-screen display condition associated with the media player, and the control unit is configured to prevent first information associated with the on-screen display condition and provided by the media player from being displayed by the projector in response to detecting the on-screen display condition.

23 Claims, 5 Drawing Sheets

U.S. PATENT DOCUMENTS

| | | | |
|---|---|---|---|
| 6,959,991 B2* | 11/2005 | Ho et al. | 353/119 |
| 7,076,149 B1* | 7/2006 | Lewis et al. | 386/46 |
| 7,372,506 B2* | 5/2008 | Cho | 348/569 |
| 2001/0013843 A1 | 8/2001 | Fujiwara et al. | |
| 2002/0060754 A1 | 5/2002 | Takeuchi | |
| 2002/0073305 A1 | 6/2002 | Joseph et al. | |
| 2002/0105624 A1 | 8/2002 | Quori | |
| 2002/0149826 A1 | 10/2002 | Ozcelik et al. | |
| 2002/0159035 A1* | 10/2002 | Koyama et al. | 353/31 |
| 2002/0171763 A1* | 11/2002 | Stecyk et al. | 348/552 |
| 2002/0175915 A1 | 11/2002 | Lichtfuss | |
| 2003/0065806 A1 | 4/2003 | Thomason et al. | |
| 2003/0117385 A1 | 6/2003 | Itoh et al. | |
| 2004/0001163 A1* | 1/2004 | Park | 348/569 |
| 2004/0017548 A1* | 1/2004 | Denmeade | 353/31 |
| 2004/0228615 A1* | 11/2004 | Schultz | 386/83 |
| 2005/0002000 A1* | 1/2005 | Salvatori et al. | 353/119 |
| 2007/0121012 A1* | 5/2007 | Hida et al. | 348/589 |

FOREIGN PATENT DOCUMENTS

| | | |
|---|---|---|
| JP | 2002-108326 | 4/2002 |
| WO | WO01/42911 | 6/2001 |

OTHER PUBLICATIONS

Manual entitled "LCD Projector User Manual" "Model XL1XSL2" Mitsubishi, pp. EN13-EN 16. Not dated.

Mitsubishi Electric, Inc., "The Mitsubishi Advantage Presentation" <http://global.mitsubishielectric.com/bu/projectors/advan/presen_b.html>.

Jeff Sauer, "Display Review—NEC HT1000", Video Systems, Jan. 1, 2003, pp. 1-3, <http://www.videosystems.com/microsites/magazinearticle.asp?mode=print&magazinearticleid=164206&r...>.

"PiXA" by Dvone, 7020 Koll Center Pkwy., Suite 138, Pleasanton, CA 94566, upated Feb. 2004, <http://www.pixainc.com/html/dht_100.html>.

Manual entitled "Using the Projector Menus" pp. 83-99.

Newswire Trade, Business Wire, p. 5008, Sep. 16, 2003 <http://www.dialogclasic.com/main.vmgw >.

\* cited by examiner

MEDIA PROJECTOR SYSTEM FOR PREVENTING THE DISPLAY OF ON-SCREEN DISPLAY INFORMATION

BACKGROUND

Manufacturers of different components used in display systems often include on-screen display (OSD) information for display during operation. For example, a projector or other type of display device may display OSD information that indicates a manufacturer of the device or other state information associated with the device. Similarly, a digital video disc (DVD) player may provide OSD information for display which indicates a manufacturer of the device or other state information associated with the device or a disc in the device. Generally, the OSD information from these components is displayed at different times such that OSD information from two different display components is not displayed simultaneously and does not present a confusing interface for a user. In the event that OSD information is displayed simultaneously, a user may make an adjustment to one or more of the components to prevent OSD information from multiple components from being displayed at the same time.

As display components are increasingly integrated or combined for sale by manufacturers, the concern with OSD information from different components being displayed simultaneously may increase. The concern may be enhanced where the components originate from different manufacturers. OSD information from different manufacturers may be inconsistent with one another in terms of the overall design, fonts, icons, and/or color schemes. In addition, OSD information from different manufacturers may be inconsistent with one another in terms of the differing behaviors that devices may undertake. For example, one device may simply ignore invalid entries from a user while another device may provide OSD information to the user to indicate an invalid entry. A manufacturer of the combined components may seek to make the combination of components more user friendly. Accordingly, it would be desirable to provide a reliable and consistent interface to a user of an integrated display device.

SUMMARY

One form of the present invention provides a system comprising a media player configured to play media content, a projector operatively coupled to the media player, and a control unit operatively coupled to the media player and the projector. The control unit is configured to detect an on-screen display condition associated with the media player, and the control unit is configured to prevent first information associated with the on-screen display condition and provided by the media player from being displayed by the projector in response to detecting the on-screen display condition.

DETAILED DESCRIPTION

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
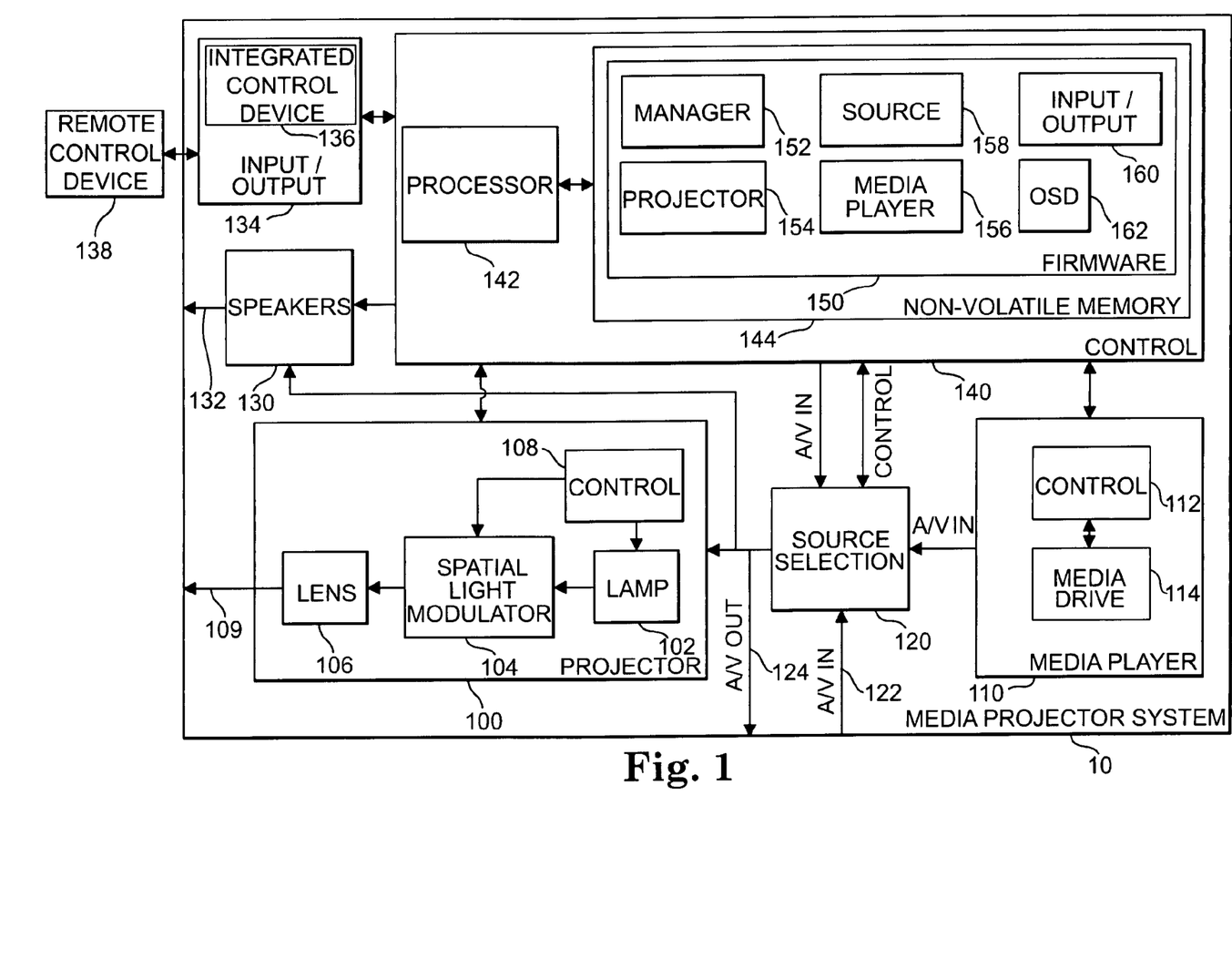
FIG. 1 is a block diagram illustrating a media projector system according to one embodiment of the present invention.

FIG. 1 is a block diagram illustrating a media projector system 10 according to one embodiment of the present invention. Media projector system 10 comprises a projector 100, a media player 110, a source selection unit 120, one or more speakers 130, an input/output unit 134, and a control unit 140. Media projection system 10, including projector 100, media player 110, source selection unit 120, speakers 130, input/output unit 134, and control unit 140, is enclosed within a housing (not shown).

Projector 100 comprises a lamp 102, a spatial light modulator 104, a lens 106, and a control unit 108. Projector 100 receives a video signal from source selection unit 120 and causes images to be displayed on a screen or other surface in response to the video signal using lamp 102, spatial light modulator 104, lens 106, and control unit 108 as indicated by an arrow 109. More specifically, lamp 102 provides a light source to spatial light modulator 104. Spatial light modulator 104 reflects selected portions of the light source through lens 106 in response to the video signal to cause images to be projected onto a screen or other surface. Control unit 108 controls the operation of lamp 102 and spatial light modulator 104. Lamp 102 may be a mercury ultra high pressure, xenon, metal halide, or other suitable projector lamp.

Figure 2A:
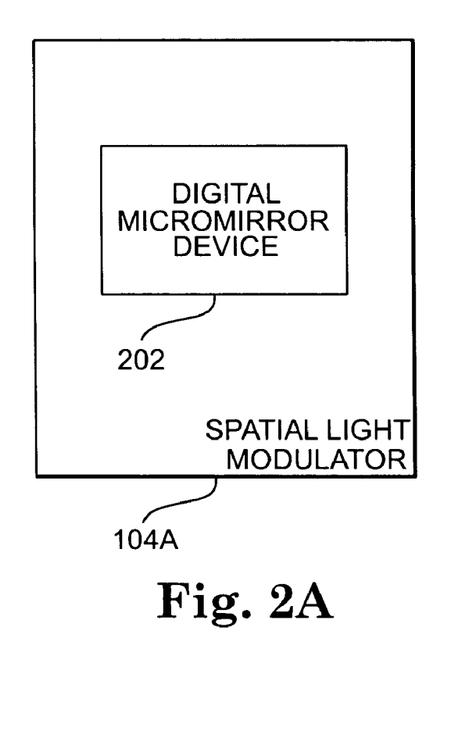
FIG. 2A is a block diagram illustrating a spatial light modulator according to one embodiment of the present invention.
Figure 2B:
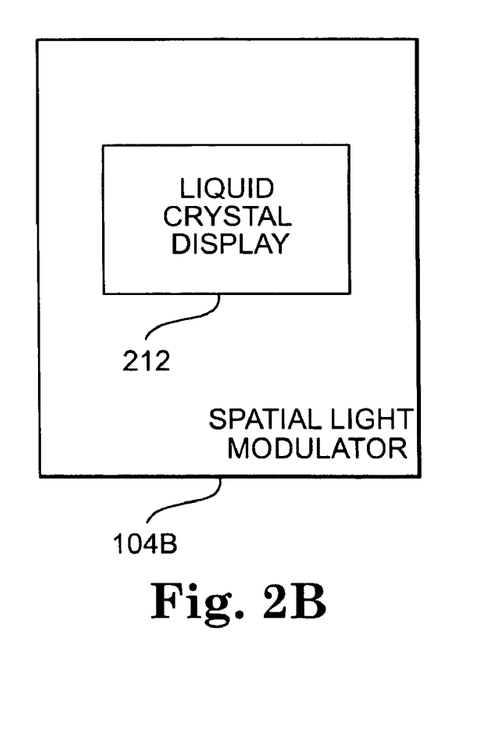
FIG. 2B is a block diagram illustrating a spatial light modulator according to one embodiment of the present invention.

As shown in FIGS. 2A and 2B, spatial light modulator 104 may comprise a digital micromirror device (DMD) or a liquid crystal display (LCD) device. FIG. 2A is a block diagram illustrating spatial light modulator 104A according to one embodiment of the present invention. FIG. 2B is a block diagram illustrating selected portions of spatial light modulator 104B according to another embodiment of the present invention. Projector 100 may comprise spatial light modulator 104A, spatial light modulator 104B, or another suitable spatial light modulator.

In the embodiment shown in FIG. 2A, spatial light modulator 104A comprises a digital micromirror device (DMD) 202. DMD 202 comprises a plurality of microscopic mirrors that are each configured to reflect or not reflect light from lamp 102. The reflected light is directed through lens 104 to form an image on a screen or other surface located remotely from projector 100.

In the embodiment shown in FIG. 2B, spatial light modulator 104B comprises a liquid crystal display (LCD) 212. LCD 212 comprises a plurality of liquid crystals configured to each transmit or block light from lamp 102. The transmitted light is directed through lens 104 to form an image on a screen or other surface located remotely from projector 100.

Projector 100 receives control signals from control unit 140 using control unit 108. Projector 100 provides information to control unit 140 using control unit 108. Control unit 108 provides control signals to lamp 102 and spatial light modulator 104. For example, control unit 108 is configured to cause lamp 102 to be turned on and off and cause power to be provided to spatial light modulator 104. Control unit 108 is also configured to detect error conditions associated with lamp 102 and spatial light modulator 104 and report error conditions to control unit 140.

Media player 110 comprises a control unit 112 and a media drive 114. Media player 110 provides media content, e.g., audio and/or visual content, from a disc or other media to projector 100 and/or speakers 130 using source selection unit 120. Media drive 114 receives one or more discs or other media inserted by a user of media projector system 10. A disc may comprise a digital video disc (DVD), a compact disc (CD) (e.g., CD-ROM, CD-R, CD-RW, and CD+RW), or other disc configured to store audio and/or visual content. The audio and/or visual content may be in various formats such as DVD, CD audio, MP3, JPEG, QuickTime, RealAudio, RealVideo, and Windows Media. Media drive 114 reads the audio and/or visual content from a disc and provides the audio and/or visual content to projector 100 and/or speakers 130 through source selection unit 120.

Media player 110 receives control signals from control unit 140 using control unit 112. Media player 110 provides information to control unit 140 using control unit 112. Control unit 108 provides control signals to media drive 114.

Source selection unit 120 receives audio/video input (A/V IN) signals from media player 110, control unit 140, and an external source (indicated by an arrow 122). Source selection unit 120 provides an audio/video output (A/V OUT) to projector 100, speakers 130, and an A/V port (indicated by an arrow 124). More specifically, source selection unit 120 selects the audio/video input from media player 110, control unit 140, or the external source in response to control signals from control unit 140. Source selection unit 120 provides the selected audio/video input as the audio/video output to projector 100, speakers 130, and the A/V port. Source selection unit 120 may be configured to selectively provide the audio/video output to projector 100, speakers 130, or the A/V port.

Speakers 130 receive audio inputs from source selection unit 120 and generate audible sounds in response to the audio inputs as indicated by an arrow 132. Speakers 130 may include audio processing to modify the audio inputs for amplification by speakers 130. Speakers 130 receive control signals from control unit 140.

Input/output (I/O) unit 134 comprises one or more integrated control devices 136 and one or more ports configured to allow an external device (not shown) or a user to communicate with media projector system 10. The ports may include an infrared (IR) port configured to provide signals from a remote control device 138 for media projector unit 10 and any other suitable ports for transferring information to and/or from an external device. The integrated control devices 136 may include keypads, buttons, dials, LEDs, and any other suitable I/O devices for receiving information from and/or providing information to the user.

Control unit 140 comprises a processor 142 and a non-volatile memory 144, e.g., a flash memory. Non-volatile memory 144 comprises firmware 150 which comprises a manager module 152, a projector module 154, a media player module 156, a source module 158, an input/output module 160, and on-screen display (OSD) information 162. Firmware 150 and each module 152, 154, 156, 158, and 160 comprise instructions that are executable by processor 142 for causing functions to be performed control unit 140.

On-screen display (OSD) information 162 comprises audio and/or visual content suitable for being played by speakers 130 and/or displayed by projector 100.

Control unit 140 generates control signals for controlling projector 100, media player 110, source selection unit 120, speakers 130, and I/O unit 134 in response to processor 142 executing instructions from firmware 150. More specifically, processor 142 executes manager module 152 to control the overall operation of media projector system 10 using projector module 154, media player module 156, source module 158, and input/output module 160. In addition, processor 142 executes projector module 154, media player module 156, source module 158, and input/output module 160 to control the operation of projector 100, media player 110, source selection unit 120, and I/O unit 134, respectively.

In other embodiments, control unit 140 may comprise other combinations of hardware and/or software components configured to perform the functions just described. Non-volatile memory 144 comprises one type of medium configured to store firmware 150 such that the instructions in firmware 150 may be accessed and executed by processor 142. In other embodiments, firmware 150 may be stored on other type of portable or non-portable media.

In operation, media projector system 10 operates source selection unit 120 to selectively inhibit display of on-screen display (OSD) information provided by media player 110. OSD information includes splash screens, menus or other graphical elements used to control projector 100 or media player 110 (e.g., a slider or key control to speed up or slow down the speed of the video play), symbols that indicate a state of media projector system 10 or media player 110 (e.g., pause or fast-forward symbols), and other textual, graphical, or symbolic elements that media player 110 attempts to display using projector 100. OSD display information does not include content from a disc in media player 110, e.g., DVD content from a DVD in media player 110. Media projector system 10 may display alternate OSD information in place of any OSD information provided by media player 110.

To prevent OSD information from being displayed, media projector system 10 detects on-screen display (OSD) conditions associated with media player 110. An OSD condition comprises any condition that would cause media player 110 to provide OSD information to projector 100 for display. OSD conditions include user inputs from integrated control device 136 or remote control device 138, states of media player 110, and other known conditions that are configured to cause media player 110 to provide OSD information to projector 100 for display. For example, media player 110 may be configured to display a splash screen in response to being powered-up and/or paused. The powering-up and/or pausing of media player 110 may comprise OSD conditions. As another example, media player 110 may be configured to display graphical icons associated with disc operations such as play, stop, pause, rewind, and fast forward selected by a user using integrated control device 136 or remote control device 138. These disc operations may comprise OSD conditions.

Figure 3:
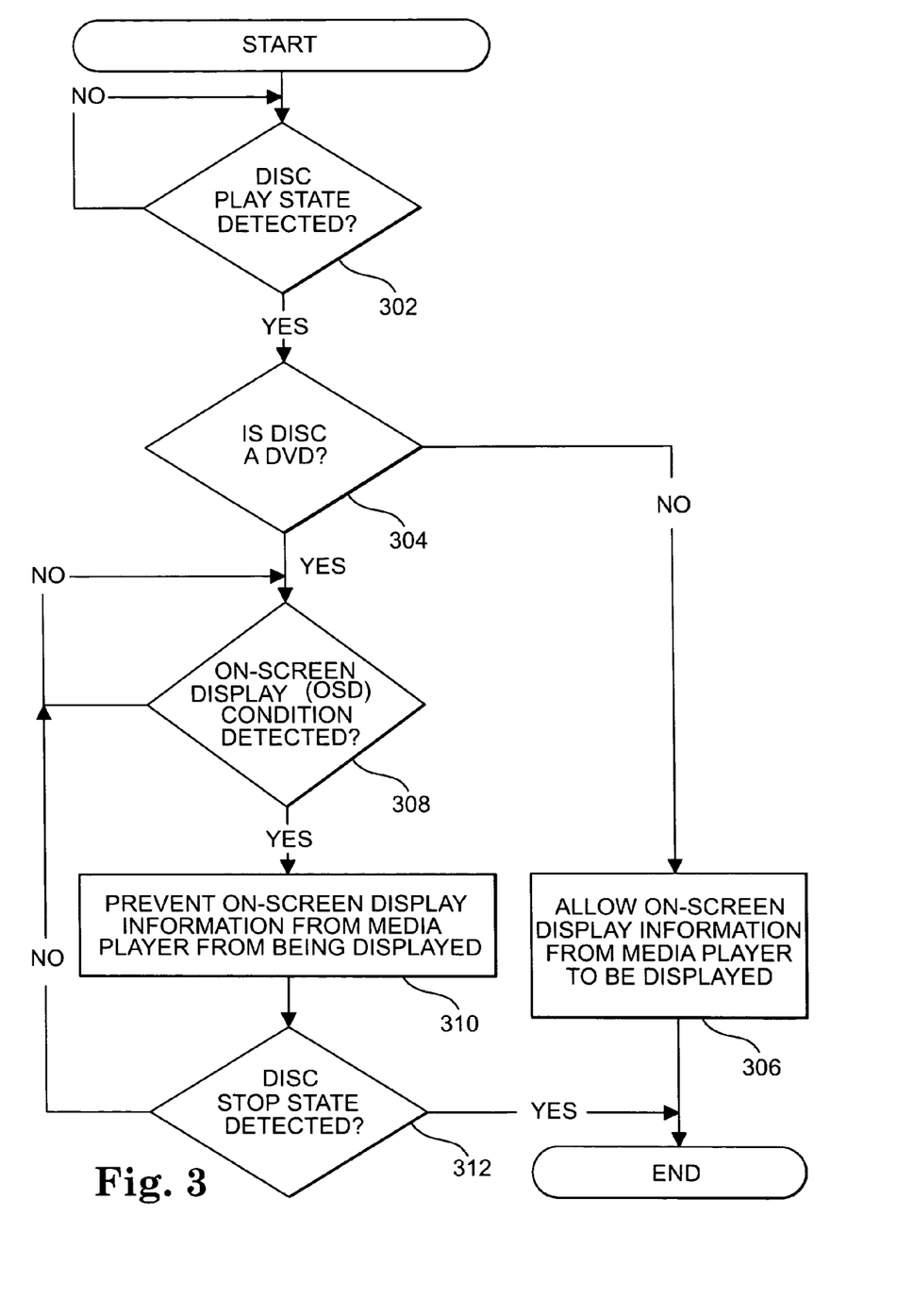
FIG. 3 is a flow chart illustrating a method for managing information displayed by a media projector system according to one embodiment of the present invention.

FIG. 3 is a flow chart illustrating a method for managing OSD information displayed by media projector system 10 according to one embodiment of the present invention. In FIG. 3, a determination is made by media projection system 10 as to whether a disc play state has been detected as indicated in a block 302. The disc play state indicates that the disc in media drive 114 is to be played by media player 110 to cause the audio and/or visual content of the disc to be provided from media player 110 to projector 100 and/or speakers 130. The disc play state may be initiated in response to any number of conditions. For example, the disc play state may be initiated in response to the disc being inserted into media drive 114. The disc play state may also be initiated in response to a user input from I/O unit 134 that requests that the disc in media player 110 be played. I/O unit 134 may receive the user input from integrated control device 136 or remote control device 138.

If a disc play state has not been detected, then media projector system 10 repeats the function of block 302 at a later time. If a disc play state has been detected, then a determination is made by media projector system 10 as to whether the disc in media player 110 is a DVD as indicated in a block 304. If the disc in media player 110 is not a DVD, then media projector system 10 allows on-screen display (OSD) information from media player 110 to be displayed by projector 100 as indicated in a block 306.

If the disc in media player 110 is a DVD, then a determination is made by media projector system 10 as to whether an on-screen display (OSD) condition has been detected as indicated in a block 308. If an OSD condition has not been detected, then media projector system 10 repeats the function of block 308 at a later time. If an OSD condition has been detected, then media projector system 10 prevents OSD information from media player 110 from being displayed by projector 100 as indicated in a block 310. Media projector system 10 may prevent the OSD information from being displayed by preventing the video signal from media player 110 from being provided to projector 100 Media projector system 10 may also cause alternate OSD information to be displayed in place of the OSD information provided by media player 110.

A determination is made by media projector system 10 as to whether a disc stop state has been detected as indicated in a block 312. If a disc stop state has not been detected, then media projector system 10 repeats the function of block 308. If a disc stop state has been detected, then the method ends as indicated.

Figure 4A:
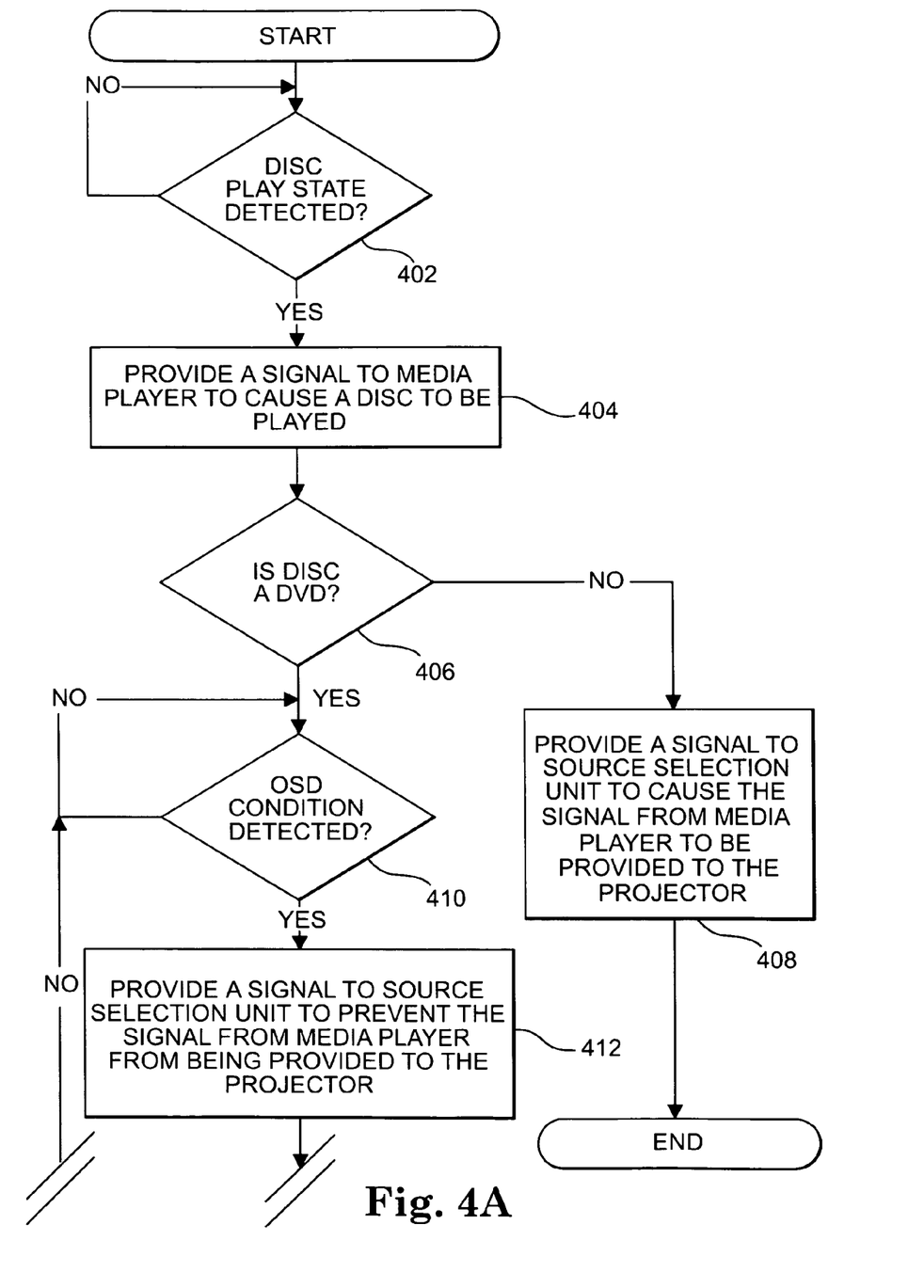
FIG. 4A is a flow chart illustrating a first portion of a method for controlling information displayed by a media projector system according to one embodiment of the present invention.
Figure 4B:
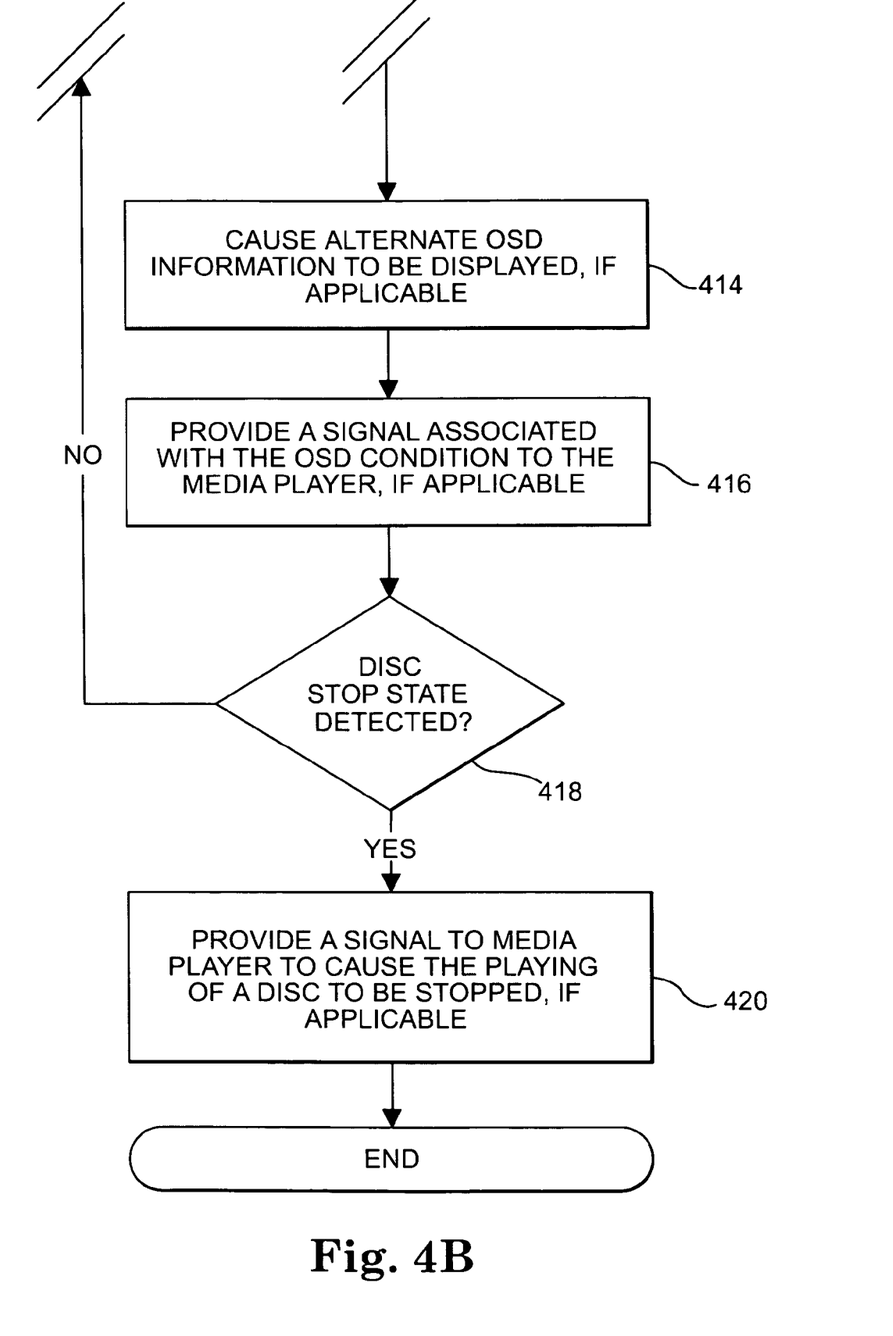
FIG. 4B is a flow chart illustrating a second portion of a method for controlling information displayed by a media projector system according to one embodiment of the present invention.

FIGS. 4A and 4B are flow charts illustrating a method for controlling OSD information displayed by media projector system 10 using control unit 140 according to one embodiment of the present invention. In FIG. 4A, a determination is made by control unit 140 as to whether a disc play state has been detected as indicated in a block 402. Control unit 140 detects a disc play state in response to input/output module 160 detecting a user input from I/O unit 134 that requests that the disc in media player 110 be played, e.g., by a user pressing a play button on integrated control device 136 or remote control device 138. Input/output module 160 provides a notification to manager module 152 in response to detecting a disc play state. Control unit 140 also detects a disc play state in response to media player module 156 receiving a disc play notification from media player 110 where a user has inserted a disc into media drive 114. Media player module 156 provides a notification to manager module 152 in response to detecting a disc play state.

If a disc play state has not been detected, then control unit 140 repeats the function of block 402 at a later time. If a disc play state has been detected, then control unit 140 provides a signal to media player 110 to cause a disc to be played as indicated in a block 404.

A determination is made by control unit 140 as to whether the disc in media player 110 is a DVD as indicated in a block 406. More specifically, media player module 156 examines information received from media player 110 which indicates whether the disc in media player 110 is a DVD. Media player module 156 notifies manager module 152 whether the disc in media player 110 is a DVD. If the disc in media player 110 is not a DVD, then control unit 140 provides a signal to source selection unit 120 to cause the video signal from media player 110 to be provided to projector 100 as indicated in a block 408. In particular, manager module 152 causes control unit 140 to provide the signal to source selection unit 120. By doing so, manager module 152 allows OSD information to be provided from media player 110 to projector 100 for display. In response to receiving the signal from control unit 140, source selection unit 120 allows the video signal that contains the OSD information to be provided to projector 100 for display.

If the disc in media player 110 is a DVD, then a determination is made by control unit 140 as to whether an on-screen display (OSD) condition has been detected as indicated in a block 410. More specifically, manager module 152 monitors inputs received by media player module 156 and input/output module 160 to detect OSD conditions. Manager module 152 detects an OSD condition in response to a signal from a media player module 156 detecting state of media player 110 configured to cause media player to provide OSD information to projector 100 for display. Manager module 152 also detects an OSD condition in response to a signal from input/output module 160 detecting a user input from integrated control device 136 or remote control device 138 configured to cause media player to provide OSD information to projector 100 for display.

If an OSD condition has not been detected, then control unit 140 repeats the function of block 410 at a later time. If an OSD condition has been detected, then control unit 140 provides a signal to source selection unit 120 to prevent the video signal from media player 110 from being provided to projector 100 as indicated in a block 412. More specifically, manager module 152 causes control unit 140 to generate the signal and provide the signal to source selection unit 120. In response to receiving the signal from control unit 140, source selection unit 120 prevents the video signal that contains the OSD information from being provided to projector 100 for display.

Referring to FIG. 4B, control unit 140 causes alternate OSD information to be displayed by projector 100 in place of the OSD information associated with the OSD condition, if applicable, as indicated by a block 414. In response to selected OSD conditions, manager module 152 causes alternate OSD information from OSD information 162 to be provided to projector 100 through source selection unit 120 for display in place of the OSD information provided by media player 110.

In an alternative embodiment, manager module 152 causes alternate OSD information from OSD information 162 to be provided directly to projector 100 without using source selection unit 120. In this embodiment, the alternate OSD information overlays the OSD information from media player 110 to prevent the OSD information from media player 110 from being displayed.

Control unit 140 provides a signal associated with the OSD condition to media player 110, if applicable, as indicated by a block 416. In response to selected OSD conditions, manager module 152 causes media player module 156 to provide a signal associated with the OSD condition to media player 110. For example, the OSD condition may be a disc pause state detected in response to a pause signal from remote control device 138. Accordingly, manager module 152 causes media player module 156 to provide a signal to media player 110 to cause media player 110 to pause the playing of a disc. Other disc operations such as play, stop, rewind, and fast forward may be handled similarly by control unit 140.

A determination is made by control unit 140 as to whether a disc stop state has been detected as indicated in a block 418. If a disc stop state has not been detected, then control unit 140 repeats the function of block 410. If a disc stop state has been detected, then control unit 140 provides a signal to media player 110 to cause the playing of a disc in media player 110 to be stopped, if applicable, as indicated in a block 420.

Embodiments described herein may provide advantages over prior solutions. For example, a media projector system that includes a projector and a media player may provide a reliable and consistent interface to the user.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A system comprising:
   a media player configured to play media content from a disc;
   a projector operatively coupled to the media player; and
   a control unit operatively coupled to the media player and the projector;
   wherein the control unit is configured:
   a) to detect an on-screen display condition associated with the media player while the media player is playing the media content,
   b) to prevent first on-screen display information associated with the on-screen display condition and provided by the media player from being displayed by the projector while the media player is playing the media content in response to detecting the on-screen display condition and in response to the disc being a digital video disc (DVD),
   c) to cause second on-screen display information from the control unit to be displayed by the projector in place of the first on-screen display information while the media player is playing the media content in response to detecting the on-screen display condition and in response to the disc being the DVD,
   d) to allow the first on-screen display information to be displayed by the projector while the media player is playing the media content in response to detecting the on-screen display condition and in response to the disc not being the DVD, and wherein the first and second on-screen display information does not include content from the disc.

2. The system of claim 1 wherein the on-screen display condition comprises a user input from an integrated control device.

3. The system of claim 1 wherein the on-screen display condition comprises a user input from a remote control device.

4. The system of claim 1 wherein the on-screen display condition comprises a state of the media player.

5. The system of claim 1 further comprising:
   a source selection unit operatively coupled to the media player, the projector, and the control unit;
   wherein the control unit is configured to cause the source selection unit to prevent the first on-screen display information associated with the on-screen display condition and provided by the media player from being displayed by the projector in response to detecting the on-screen display condition and in response to the disc being the DVD.

6. The system of claim 5 wherein the control unit is configured to cause the source selection unit to provide the second on-screen display information to the projector in place of the first on-screen display information while the media player is playing the media content in response to detecting the on-screen display condition and in response to the disc being the DVD.

7. The system of claim 6 wherein the control unit is configured to provide the second on-screen display information to the source selection unit.

8. The system of claim 7 wherein the projector comprises a digital micromirror device (DMD).

9. The system of claim 7 wherein the projector comprises a liquid crystal display (LCD) device.

10. The system of claim 1 wherein the media content is stored on the disc.

11. The system of claim 1 further comprising:
    a speaker operatively coupled to the media player.

12. The system of claim 1 further comprising:
    an input/output unit operatively coupled to the control unit;
    wherein the input/output unit is configured to receive a signal from a remote control device.

13. A method performed by a control unit of a media projector system including a projector and a media player, the method comprising:
    detecting an on-screen display condition associated with the media player while the media player is playing media content from a disc;
    preventing first on-screen display information associated with the on-screen display condition and provided by the media player from being displayed by the projector while the media player is playing the media content in response to detecting the on-screen display condition and in response to the disc being a digital video disc (DVD);
    causing second on-screen display information from the control unit to be displayed by the projector in place of the first on-screen display information while the media player is playing the media content in response to detecting the on-screen display condition and in response to the disc being the DVD;
    allowing the first on-screen display information to be displayed by the projector while the media player is playing the media content in response to detecting the on-screen display condition and in response to the disc not being the DVD, and wherein the first and second on-screen display information does not include content from the disc.

14. The method of claim 13 further comprising:
    determining whether the disc in the media player comprises the DVD; and
    detecting the on-screen display condition associated with the media player subsequent to determining that the disc in the media player comprises the DVD.

15. The method of claim 14 further comprising:
    determining whether a disc play state has been detected;
    providing a signal to the media player to cause the disc to be played in response to determining that the disc play state has been detected; and determining whether the disc in the media player comprises the DVD subsequent to determining that the disc play state has been detected.

16. The method of claim 13 wherein preventing the first on-screen display information associated with the on-screen display condition and provided by the media player from being displayed by the projector includes causing the first on-screen display information not to be provided to the projector.

17. The method of claim 13 further comprising:
providing a signal associated with the on-screen display condition to the media player.

18. The method of claim 13 wherein the first on-screen display information comprises a splash screen.

19. The method of claim 13 wherein the first on-screen display information comprises a symbol.

20. A system including a media player configured to play a disc and a projector operatively coupled to the media player, the system comprising:
means for detecting an on-screen display condition associated with the media player while the media player is playing media content from the disc;
means for preventing first on-screen display information associated with the on-screen display condition and provided by the media player from being displayed by the projector while the media player is playing the media content in response to detecting the on-screen display condition and in response to the disc being a digital video disc (DVD);
means for causing second on-screen display information from the control unit to be displayed by the projector in place of the first on-screen display information while the media player is playing the media content in response to detecting the on-screen display condition and in response to the disc being the DVD;
means for allowing the first on-screen display information to be displayed by the projector while the media player is playing the media content in response to detecting the on-screen display condition and in response to the disc not being the DVD, and wherein the first and second on-screen display information does not include content from the disc.

21. The system of claim 20 further comprising:
means for determining whether a disc in the media player comprises the DVD.

22. The system of claim 20 further comprising:
means for detecting a user input associated with the on-screen display condition.

23. The system of claim 20 further comprising:
means for detecting a signal from the media player associated with the on-screen display condition.

\* \* \* \* \*